US010422659B2

(12) United States Patent
Smith

(10) Patent No.: US 10,422,659 B2
(45) Date of Patent: Sep. 24, 2019

(54) SYSTEM FOR DETECTING MECHANICAL DISCONNECT OF A SENSOR FROM A CONTROLLED ELEMENT

(71) Applicant: BOMBARDIER INC., Dorval (CA)

(72) Inventor: Timothy Smith, Dollard Des Ormeaux (CA)

(73) Assignee: BOMBARDIER INC., Dorval (CA)

( * ) Notice: Subject to any disclaimer, the term of this patent is extended or adjusted under 35 U.S.C. 154(b) by 141 days.

(21) Appl. No.: 15/128,739

(22) PCT Filed: Mar. 23, 2015

(86) PCT No.: PCT/IB2015/052104
§ 371 (c)(1),
(2) Date: Sep. 23, 2016

(87) PCT Pub. No.: WO2015/150965
PCT Pub. Date: Oct. 8, 2015

(65) Prior Publication Data
US 2018/0180446 A1   Jun. 28, 2018

Related U.S. Application Data

(60) Provisional application No. 61/972,668, filed on Mar. 31, 2014.

(51) Int. Cl.
*G01D 3/08* (2006.01)
*G01D 5/22* (2006.01)
*B64C 13/42* (2006.01)

(52) U.S. Cl.
CPC ............... *G01D 3/08* (2013.01); *B64C 13/42* (2013.01); *G01D 5/2291* (2013.01)

(58) Field of Classification Search
CPC .......... G01D 3/08; G01D 5/2291; B64C 13/42
See application file for complete search history.

(56) References Cited

U.S. PATENT DOCUMENTS 4,175,331 A   11/1979   Johnson
4,292,740 A   10/1981   Vis et al.
(Continued)

FOREIGN PATENT DOCUMENTS

CN        1389705 A     1/2003
CN      101788627 A     7/2010
(Continued)

OTHER PUBLICATIONS

English translation of Chinese patent document No. CN1389705(A) dated Jan. 8, 2003, https://encrypted.google.com/patents/CN1389705A?cl=en, accessed on Jan. 17, 2018.
(Continued)

*Primary Examiner* — Patrick Assouad
*Assistant Examiner* — Haidong Zhang
(74) *Attorney, Agent, or Firm* — Norton Rose Fulbright Canada LLP

(57) ABSTRACT

A system for detecting mechanical failure of a connection between a variable differential transformer and a controlled element. The sensor system includes a variable differential transformer with a housing encapsulating a first coil, a bore in the housing, wherein the bore is adjacent to the first coil, a core disposed in the bore, a shaft connectible between the core, at a first end, and the controlled element, at a second end, and a biasing element connected to the shaft. Responsive to a break in the shaft, the biasing element moves the core to an out-of-range position detectable by at least the first coil.

18 Claims, 7 Drawing Sheets

(56) References Cited

U.S. PATENT DOCUMENTS

| | | | | |
|---|---|---|---|---|
| 4,473,950 A | * | 10/1984 | Finn | G01B 5/003 |
| | | | | 33/605 |
| 4,543,732 A | | 10/1985 | Maples | |
| 4,628,499 A | * | 12/1986 | Hammett | F15B 11/048 |
| | | | | 318/599 |
| 5,121,042 A | * | 6/1992 | Ako | F15B 13/16 |
| | | | | 318/135 |
| 5,563,355 A | * | 10/1996 | Pluta | B60T 7/042 |
| | | | | 303/188 |
| 6,710,592 B2 | | 3/2004 | Hiramatsu et al. | |
| 7,138,794 B1 | | 11/2006 | Cook et al. | |
| 8,508,168 B2 | * | 8/2013 | Duits | F16H 25/2015 |
| | | | | 318/468 |
| 8,672,291 B2 | * | 3/2014 | Tyler | F16K 31/0655 |
| | | | | 251/129.04 |
| 2003/0006761 A1 | | 1/2003 | Hiramatsu et al. | |
| 2005/0103932 A1 | | 5/2005 | Huynh | |
| 2007/0146942 A1 | | 6/2007 | Covington et al. | |
| 2012/0290238 A1 | | 11/2012 | Nair et al. | |
| 2015/0142353 A1 | | 5/2015 | Cabret et al. | |

FOREIGN PATENT DOCUMENTS

| | | |
|---|---|---|
| CN | 202926406 | 5/2013 |
| WO | 2006045210 A1 | 5/2006 |
| WO | 2014001698 A2 | 1/2014 |

OTHER PUBLICATIONS

The State Intellectual Property Office of the People's Republic of China, Notification of First Office Action dated Dec. 4, 2017 re: Chinese Patent Application No. 201580018259.1.

Gao Qiang, Fault Analysis and Countermeasures of 2×350 MW Steam Turbine DEH System, China Academic Journals Full-text Database, Dec. 31, 2013, China.

English Abstract of Gao Qiang, Fault Analysis and Countermeasures of 2×350 MW Steam Turbine DEH System, China Academic Journals Full-text Database, Dec. 31, 2013, China.

English translation of Chinese patent document No. CN 101788627 dated Jul. 28, 2010; www.google.ca/patents . . . .

English translation of Chinese patent document No. CN 202926406 dated May 8, 2013; www.google.ca/patents . . . .

PCT international Search Report and Written Opinion dated Jun. 5, 2015 re: International Application No. PCT/IB2015/052104.

Kavlico Corporation, Linear Variable Differential Transformers, Jun. 1997, Revised May 2000.

Carlos Da Silva et al., A knowledge-based system approach for sensor fault modeling, detection and mitigation, 2012, pp. 10977-10989, Expert Systems with Applications 39, USA.

English translation of WO2006/045210A1, obtained from www37.orbit.com . . . .

The State Intellectual Property Office of the People's Republic of China, Notification of Second Office Action dated Aug. 1, 2018 re: Chinese Patent Application No. 201580018259.1.

* cited by examiner

SYSTEM FOR DETECTING MECHANICAL DISCONNECT OF A SENSOR FROM A CONTROLLED ELEMENT

CROSS-REFERENCE TO RELATED APPLICATION(S)

This application is a national phase application under 35 U.S.C. 371 of International Patent Application No. PCT/IB2015/052104 filed on Mar. 23, 2015, which claims priority from U.S. Provisional Patent Application Ser. No. 61/972,668, filed on Mar. 31, 2014, the entire content of which is incorporated herein by reference.

FIELD OF THE INVENTION

The present invention concerns a system for detecting a mechanical disconnect of a sensor from a controlled element. More specifically, the present invention concerns a system to detect a mechanical disconnect between a variable differential transformer and a controlled element to which the variable differential transformer is attached. The controlled element may be connected to a control surface on an aircraft, for example.

DISCUSSION OF RELATED ART

The prior art is replete with examples of apparatuses designed to detect if a sensor connected to a controlled element is operating properly.

As may be expected, the prior art includes examples of apparatuses for determining if a sensor has become disconnected from a controlled element, including a control element on an aircraft.

Many prior art examples of sensor disconnect apparatuses rely on a comparison of generated electrical signals to detect instances of a failure of a variable differential transformer such as a linear variable differential transformer ("LVDT") or a rotary variable differential transformer ("RVDT").

Despite several examples of means to detect if an LVDT or RVDT sensor (and its associated controlled element) is operating within acceptable ranges, a demand for alternative means remains.

Specifically, a demand remains for a way to detect a mechanical failure of an LVDT or an RVDT sensor during operation.

SUMMARY OF THE INVENTION

The present invention addresses one or more of the deficiencies apparent in the prior art.

The present invention provides a system for detecting mechanical failure of a connection between a variable differential transformer and a controlled element. The system includes a variable differential transformer with a housing encapsulating a first coil, a bore in the housing, wherein the bore is adjacent to the first coil, a core disposed in the bore, a shaft connectible between the core, at a first end, and the controlled element, at a second end, and a biasing element connected to the shaft. Responsive to a break in the shaft, the biasing element moves the core to an out-of-range position detectable by at least the first coil.

The present invention also provides for a core that is disposed in the bore such that the core slides within the bore, the out-of-range position corresponding to a maximum location away from the controlled element. In connection with this embodiment, the variable differential transformer may be an LVDT.

It is also contemplated that the invention provides for a core that is disposed in the bore such that the core rotates within the bore such that the out-of-range position corresponds to a maximum rotation of the core in the bore. In connection with this embodiment, the variable differential transformer may be an RVDT.

The present invention also provides for embodiments that include a second coil and a third coil disposed in the vicinity of the first coil. If so, the out-of-range position may be detectible by at least one of the second coil or the third coil.

In embodiments of the system of the present invention, the coils are made up of coils of wires for conducting an electrical current.

In other contemplated embodiments, the cores may be at least one of a magnet or a magnetized material.

It is contemplated that the biasing element may be a spring. If so, the spring may be a coil spring.

In the case of the LVDT, the system may include a spring housing disposed around the spring, wherein the spring housing moves together with the shaft after the break in the shaft.

In the case of the LVDT, the system may include a spring plate disposed on the shaft and at least one protrusion disposed on the shaft to connect the spring plate to the shaft. The spring plate is contemplated to move together with the shaft after a break in the shaft.

In embodiments of the system of the present invention, the second end of the shaft may include a threaded section and a large diameter section adjacent to the threaded section, between the first end and the second end of the shaft. The large diameter section is contemplated to engage the spring housing.

In one contemplated embodiment, the threaded section is adapted to engage a piston within the controlled element.

In another contemplated embodiment, the biasing element is disposed adjacent to the control element.

It is contemplated that the biasing element may be disposed adjacent to the housing for the variable differential transformer.

It is also contemplated that the system may include a lever connected to the shaft, wherein the biasing element connects between a connection point and the lever. Here, the biasing element may be disposed adjacent to the controlled element, outside of the housing for the variable differential transformer. Alternatively, the biasing element may be disposed within the housing for the variable differential transformer.

Other aspects of the present invention will be made apparent from the discussion that follows.

BRIEF DESCRIPTION OF THE DRAWINGS

One or more embodiments of the present invention are described with reference to the accompanying drawings, in which.

DETAILED DESCRIPTION OF EMBODIMENT(S) OF THE INVENTION

The present invention will now be described in connection with one or more embodiments thereof. Elements from individual embodiments are contemplated to be substitutable for elements in other embodiments. In addition, those skilled in the art will appreciate one or more variations and/or equivalents after appreciating the discussion that follows. Those variations and equivalents are considered to be encompassed by the present invention as if described herein.

Figure 1:
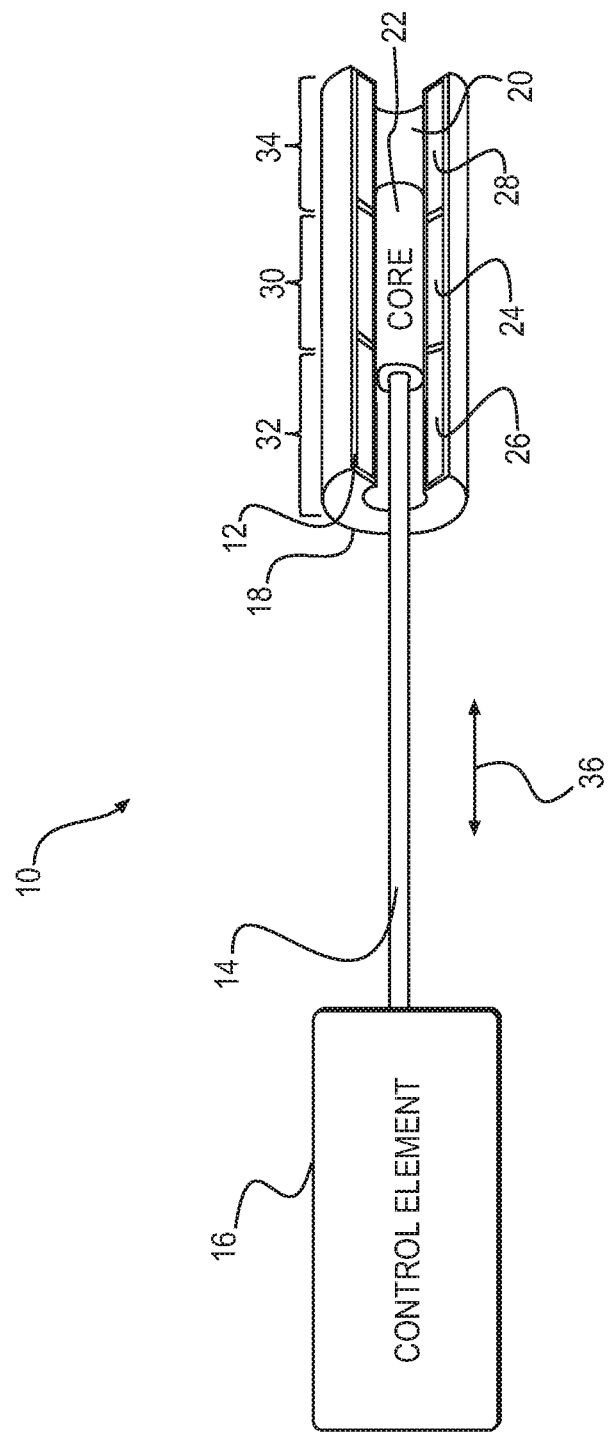
FIG. 1 is a schematic illustration of an LVDT sensor connected to a control element according to the prior art.

FIG. 1 is a graphical representation of a sensor system 10 according to the prior art. The sensor system 10 includes an LVDT 12 that is connected, via a shaft 14, to a control element 16. The LVDT 12 is contemplated to have a construction known to those skilled in the art.

Like the LVDT 12, the control element 16 is contemplated to have a construction known to those skilled in the art. In particular, the control element 16 is contemplated to incorporate a hydraulic actuator that connects to a control surface on an aircraft. The control element 16 may be, for example, a hydraulically-operated piston that controls the positioning of the control surface and, therefore, controls the aerodynamic properties of the aircraft. Control surfaces include, but are not limited to the rudder of the aircraft, ailerons, slats, flaps, etc.

As should be apparent to those skilled in the art, LVDTs 12 typically are used in combination with control elements 16 associated with one or more control surfaces on the aircraft. LVDTs 12 are compact and light weight. In addition, LVDTs 12 reliably produce signals indicative of the position of the control surface.

The LVDT 12 is contemplated to include a housing 18 with a central bore 20. A core 22 is disposed at one end of the shaft 14 and is slidingly disposed in the bore 20 within the housing 18. The housing 18 of the LVDT 12 houses a primary winding 24, a first secondary winding 26, and a second secondary winding 28. The secondary windings 26, 28 flank the primary winding 24 within the housing 18. It is conventional for the windings 24, 26, 28 to be secured in the housing 18 via an adhesive, such as an epoxy.

As illustrated in FIG. 1, the shaft 14 and the core 22 are connected to one another. As a result, when the control element 16 is actuated, the shaft 14 acts in the core 22 to move the core 22 with respect to the windings 24, 26, 28. As the core moves in relation to the windings 24, 26, 28, the core 22 causes an electrical signal to be generated that is proportional to the location of the core 22 with respect to the windings 24, 26, 28. The electrical signal is used as input to a system for controlling the control surfaces on the aircraft.

As illustrated in FIG. 1, the primary coil 24 establishes a primary sensing region 30 for the LVDT 12. The first secondary coil 26 establishes a first secondary sensing region 32. The second secondary coil 28 establishes a second secondary sensing region 34. During normal operation, the core 22 is contemplated to be positioned adjacent to the primary sensing region 30. As the control element responds to changes in the position of the control surface, the core 22 will be pulled into proximity with the first secondary sensing region 32 or pushed into proximity with the second secondary sensing region 34. The direction of travel of the shaft 14 and the core 22 is indicated by the arrows 36. As the core 22 moves in relation to the sensing regions 30, 32, 34, the LVDT 12 generates different positional signals that are processed further by the computer systems on board the aircraft.

For redundancy, it is noted each control surface on an aircraft typically is attached to two LVDTs 12. With this orientation, if one of the two LVDTs 12 fails, the system receiving the positional signals from the LVDTs 12 may determine the existence of a fault. Simply, the two LVDTs 12 will generate different output signals. However, in the prior art, the sensor system 10 is unable to determine which of the two LVDTs 12 is generating the erroneous signal. All that the system perceives is that the two LVDTs 12 are generating different signals and, therefore, that there is a fault associated with the control surface to which the LVDTs 12 are connected.

As should be apparent from FIG. 1, if the shaft 14 of one of the two LVDTs 12 connected to a control element 16 breaks, the core 22 will no longer move in a deterministic manner within the housing 18. On the other hand, the positional signal from the functional LVDT 12 will continue to change with alterations in the position of the control surface. The computer system receiving the positional signals from the LVDTs 12, however, is not likely to be able to differentiate between the positional signals for the two LVDTs 12. In other words, the computer system that receives the positional signals from the LVDTs 12 is unlikely to be able to determine which of the two signals is providing correct information for control over the associated flight surface.

Figure 2:
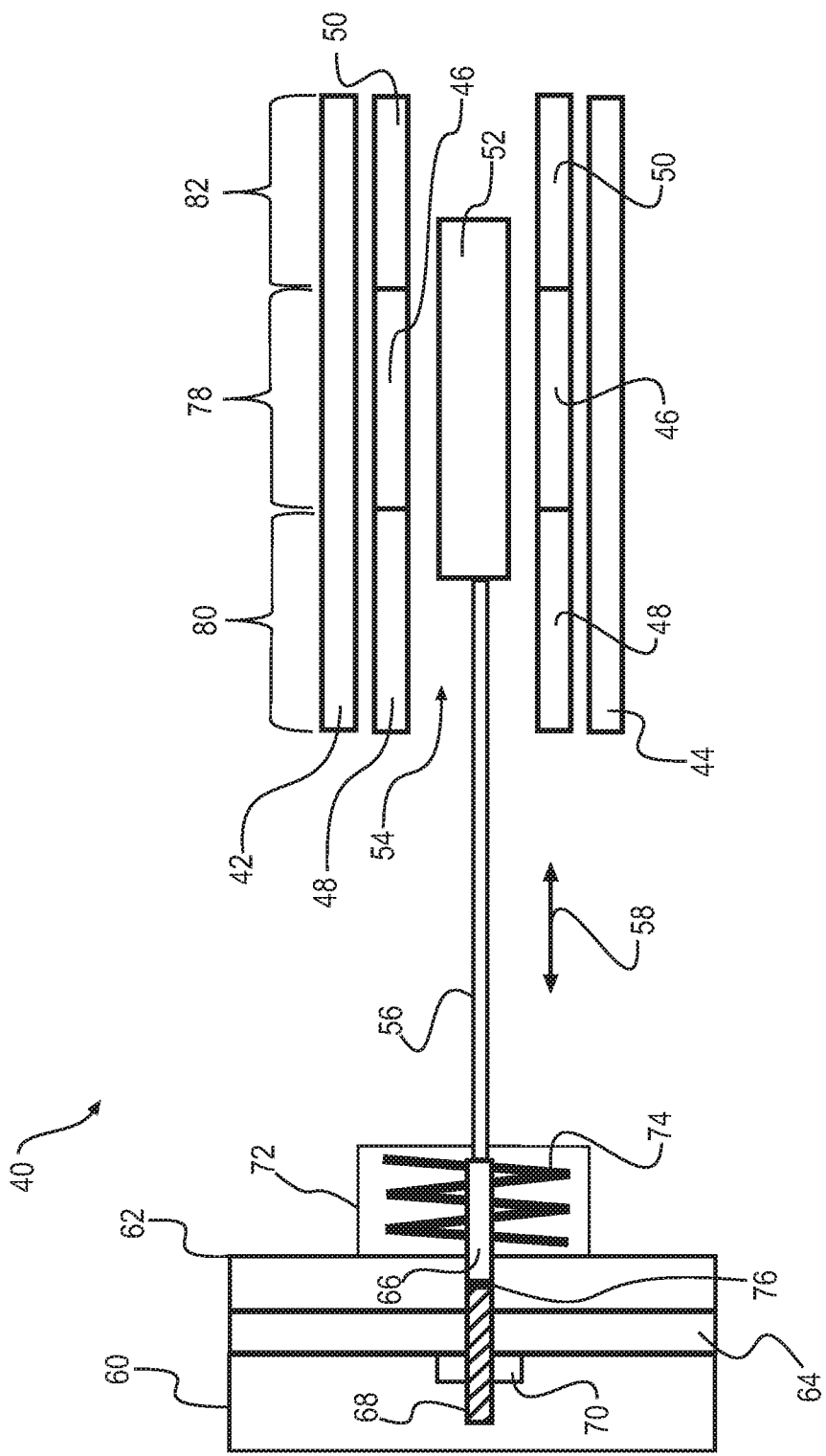
FIG. 2 is a graphical representation of a first embodiment of a system for detecting a mechanical disconnect between a sensor and a control element associated with a control surface on an aircraft, with the system being shown in a connected state with an LVDT.

FIG. 2 is a graphical illustration of a first contemplated embodiment of a sensor system 40 according to the present invention. As will be made apparent from the discussion that follows, the term "sensor system" 40 is intended to be understood broadly to refer to the apparatus and its associated components, as described herein.

Figure 7:
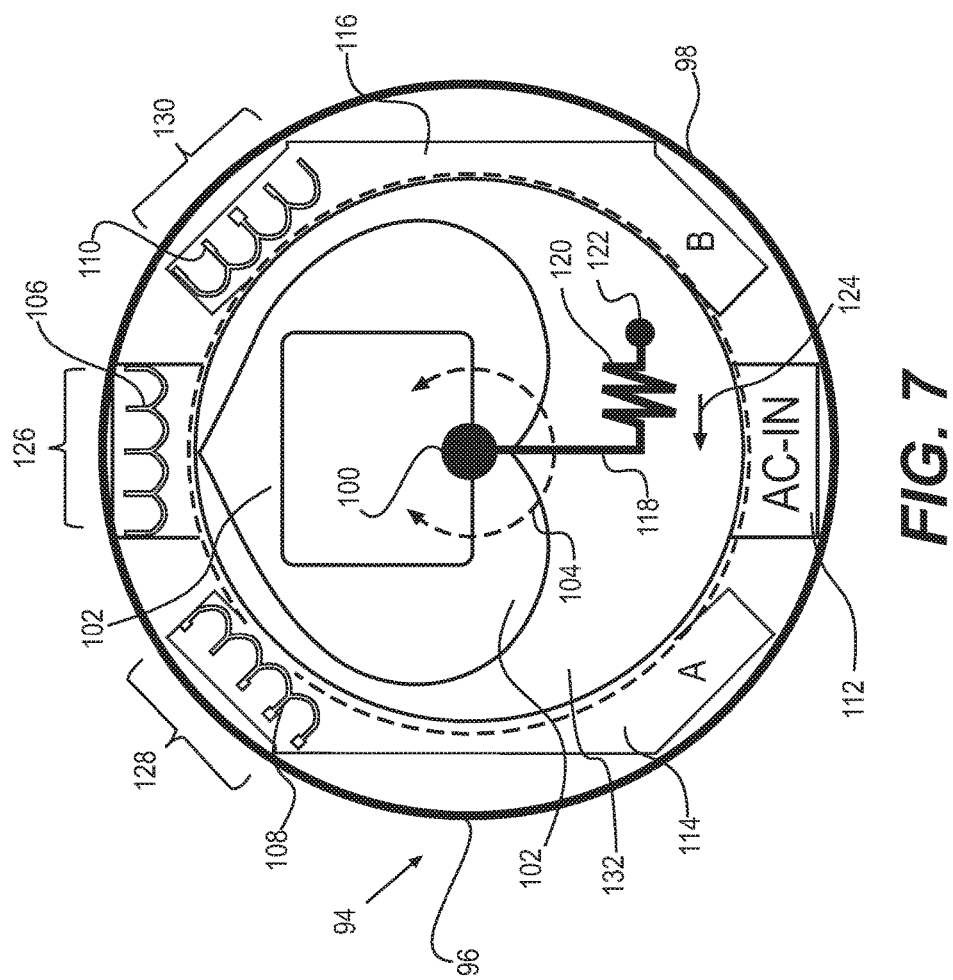
FIG. 7 is a graphical representation of a third embodiment of the system for detecting a mechanical disconnect between a sensor and a control element, with the system being shown in a connected state with an RVDT.

As illustrated in FIG. 2, the sensor system 40 includes an LVDT 42. As illustrated in FIG. 7, the sensor system 94 includes an RVDT 96. The embodiments of the sensor system 40, 94 (among others) that are described herein are contemplated to be employed in connection with variable differential transformers ("VDTs") whether they are of the linear or rotary type (or any other type now known or developed in the future). Accordingly, the present invention should not be understood to be limited to LVDTs 42 or RVDTs 96.

With continued reference to FIG. 2, the LVDT 44 includes a housing 44 that encloses a primary coil 46, a first secondary coil 48, and a second secondary coil 50. A core 52 is slidably disposed within a bore 54 in the housing 44. The core 52, which is connected to one end of a shaft 56, slides in the direction of the arrows 58 together with the shaft 56.

As also shown in FIG. 2, the LVDT 42 connects to the controlled element 60 via the shaft 56. A "controlled element" 60 is any element that is controlled by another device, system, method, or the like. A "controlled element" 60 encompasses a control element 16, such as the type normally employed to manipulate a control surface on an aircraft. In other words, the term controlled element" 60 is intended to encompass a broader category of devices than those connected to control surfaces on an aircraft.

The controlled element 60 is contemplated to be a bi-directional, hydraulically-actuated cylinder or the like. As such, the controlled element 60 includes a housing 62 with a piston 64 slidably disposed therein.

The first end of the shaft 56 connects to the core 52. The second end of the shaft 56 includes a large diameter section 66 and a threaded section 68. The threaded section 68 connects to the piston 64 via a connector 70, such as a fastener. Being connected to the piston 64, the shaft 56 and the core 52 move together with the piston 64. As such, movement of the core 52 within the LVDT 42 correlates with the movement of the piston 64. Accordingly, positional signals generated by the LVDT 42 accurately reflects the position of the piston 64 and, therefore, the control surface connected to the controlled element 60.

The second end of the shaft 56 passes through a spring housing 72 that abuts against the housing 62 of the controlled element 60. The spring housing 72 encases a spring 74 therein. The spring 74 applies a bias against the spring housing 72. As such, if the shaft 56 should break at a break point 76, for example, the spring 74 pushes against the spring housing 72. Due to the connection between the spring housing 72 and the shaft 56, when the spring 74 pushes on the spring housing 72, the spring 74 displaces the shaft 56 so that the core 52 is moved to a position adjacent to the second secondary coil 50.

In the arrangement for the sensor system 40 illustrated in FIG. 2, the break point 76 is a location where the shaft 56 is likely to break, given the proximity to the piston 64 and the housing 62. While the break point 76 is identified at this specific location, it is noted that the present invention is not limited to detecting the break point 76 in the specific location identified.

Figure 3:
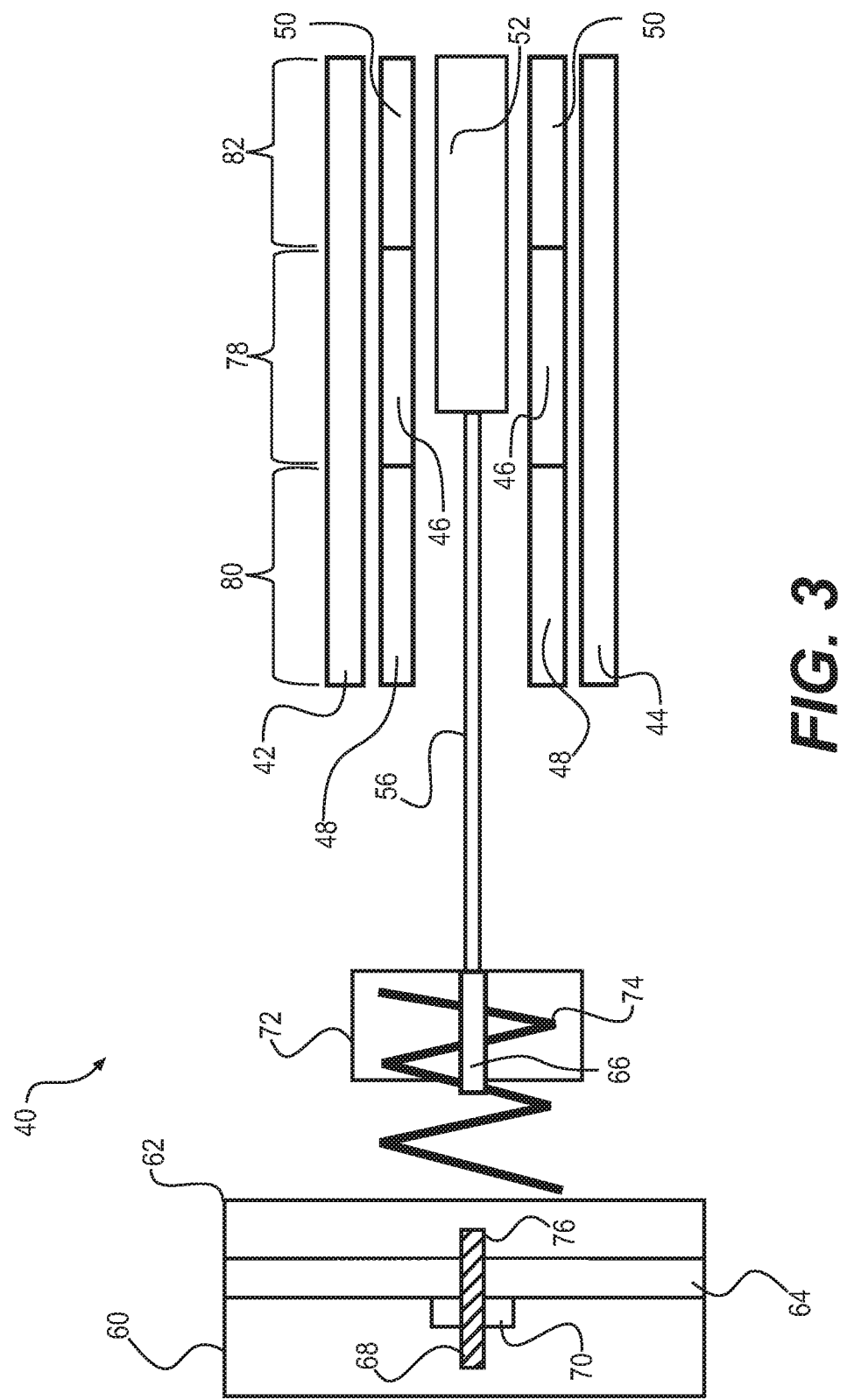
FIG. 3 is a graphical representation of the embodiment of the system for detecting a mechanical disconnect between a sensor and a control element as shown in FIG. 2, with the system being shown in a disconnected state from the LVDT.

FIG. 3 illustrates the sensor system 40 in a condition after there has been a break of the shaft 56 at the break point 76. In this illustration, the core 52 is shown in the disconnected state. In the disconnected state, the core 52 is located adjacent to the second secondary coil 50. As such, the core 52 generates a positional signal consistent with the second secondary coil 50.

It is contemplated that, in the disconnected state of the LVDT 42, the core 52 will be moved to a position in the bore 54 that is outside of the normal operating range for the LVDT 42. With the core 52 in a non-operational position (i.e., outside of the normal operating range), the second secondary coil 50 will generate a corresponding, position signal that is outside of the normal operational range for the LVDT 42. With the core 52 being positioned "out of range," it becomes possible for the flight system on the aircraft to readily detect that the LVDT 42 has suffered from a mechanical failure based on the positional signal generated by the LVDT 42.

As illustrated in FIG. 3, the primary coil 46 is associated with a primary sensing region 78. The first secondary coil 48 is associated with a first secondary sensing region 80. The second secondary coil 50 is associated with a second secondary sensing region 82. Thus, when the core 52 is displaced by the spring 74 after there has been a break at the break point 76, the second secondary sensing region 82 generates the positional signal that indicates a mechanical failure of the LVDT 42 by generating the "out of range" signal.

As should be apparent to those skilled in the art, the coils 46, 48, 50 are contemplated to be electrically conductive coils made from wound wires. When a current is applied to the coils 46, 48, 50, the coils generate an electromagnetic field. The core 52 is contemplated to be a magnet or a magnetized material that alters or disrupts the electromagnetic field generated by the coils 46, 48, 50. Due to magnetic inductance, the core 52 interacts with the coils 46, 48, 50 so that the positional signal may be generated by the LVDT 42.

Figure 4:
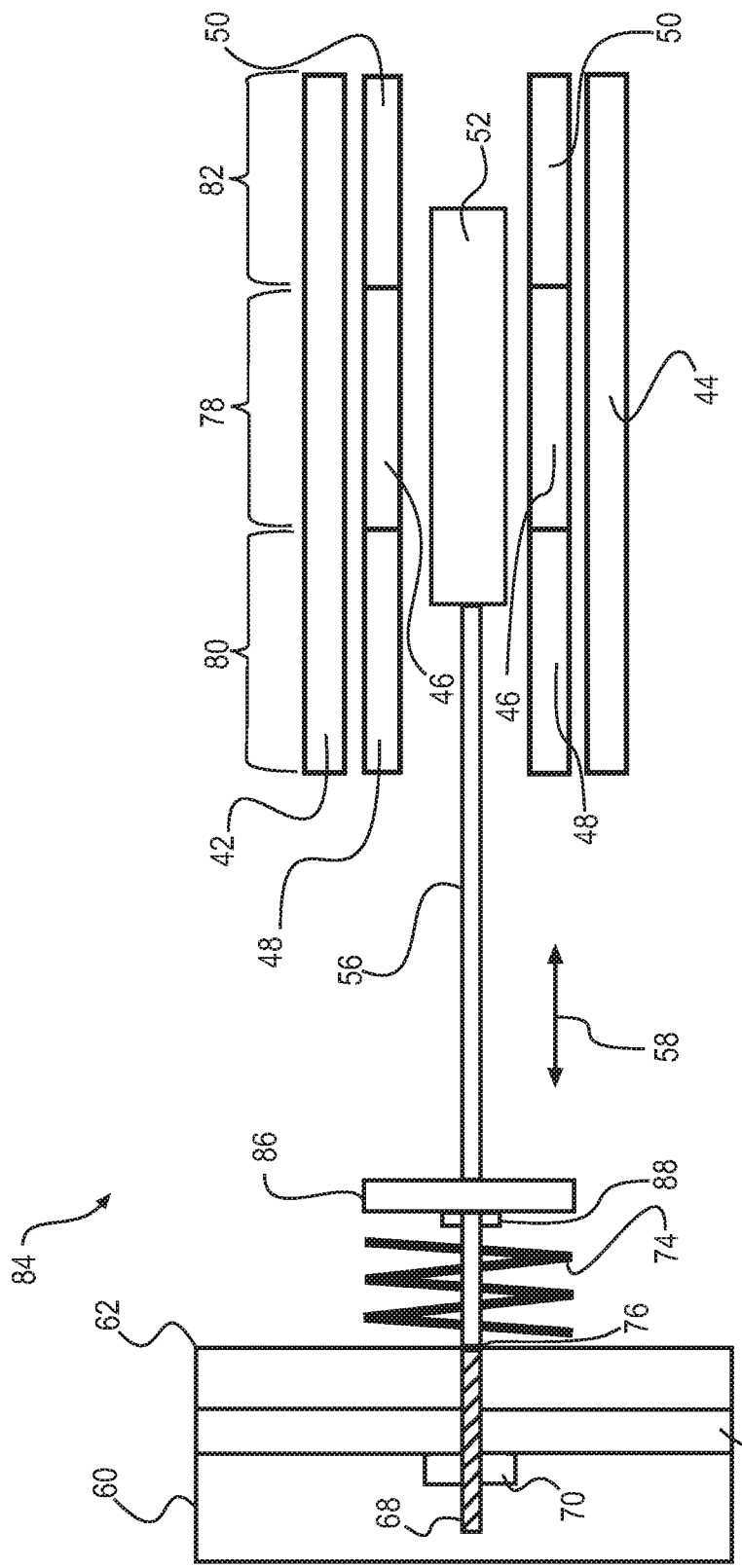
FIG. 4 is a graphical representation of a second embodiment of a system for detecting a mechanical disconnect between a sensor and a control element associated with a control surface on an aircraft, with the system being shown in a connected state with the LVDT.

FIG. 4 is a graphical illustration of a second contemplated embodiment of a sensor system 84.

The sensor system 84 is essentially the same as the sensor system 40. In this embodiment, the spring housing 72 has been removed and replaced with a spring plate 86. The spring plate 86 connects to the shaft 56 via one or more protrusions 88.

When there is a break in the shaft 56 at the break point 76, the spring 74 applies a biasing force against the spring plate 86 to push the core 52 into the abnormal range of the second secondary sensing region 82 associated with the second secondary coil 50.

FIG. 4 illustrates the sensor system 84 in the connected state, where the LVDT 42 is operating according to normal operating parameters.

Figure 5:
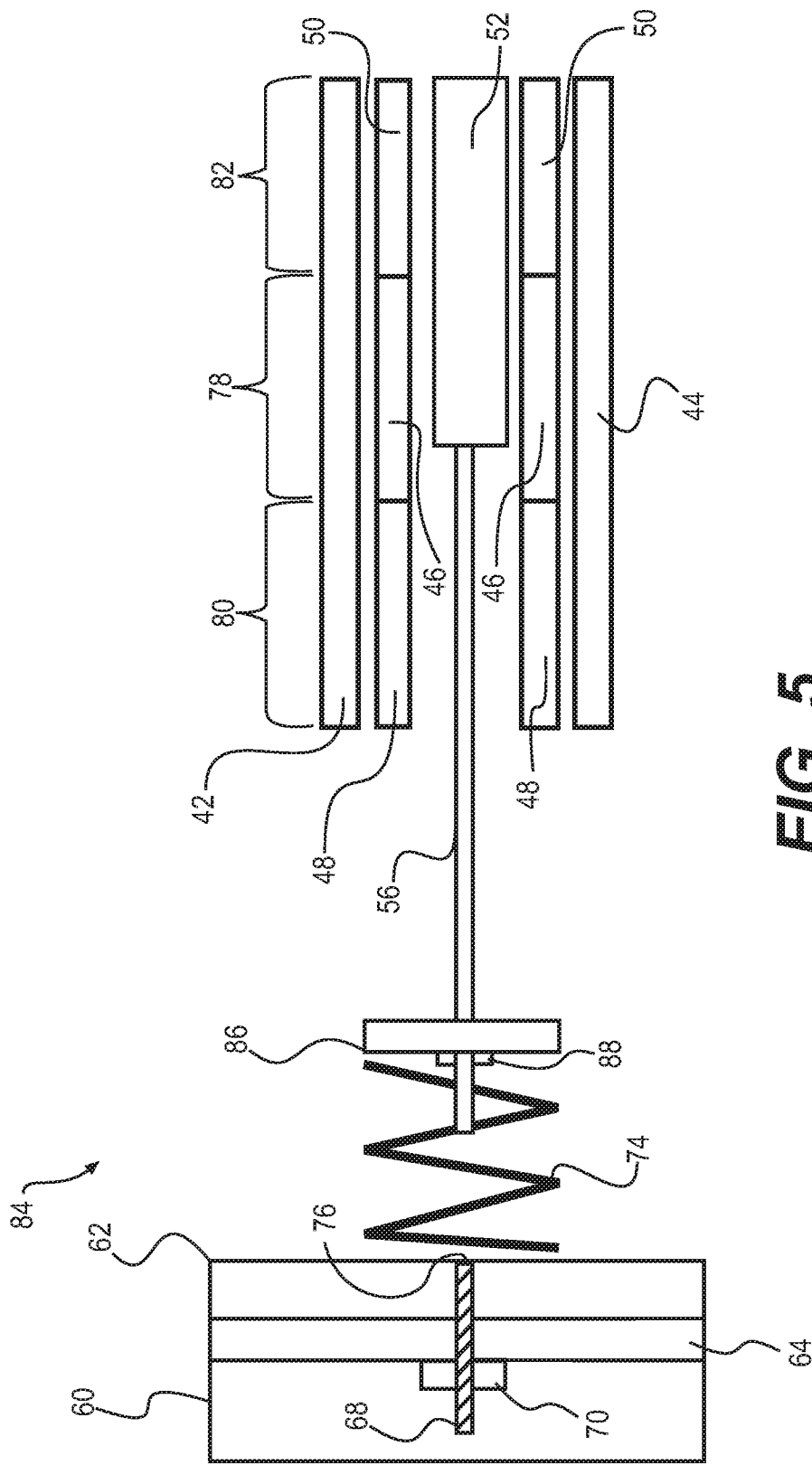
FIG. 5 is a graphical representation of the embodiment of the system for detecting a mechanical disconnect between a sensor and a control element as shown in FIG. 4, with the system being shown in a disconnected state with the LVDT.

FIG. 5 illustrates the sensor system 84 in the disconnected state (or "out of range" state), after the shaft 56 breaks at the break point 76.

In one contemplated variation, the spring 74 may be positioned adjacent to the housing 44 for the LVDT 42. In other words, the present invention should not be considered as being limited to an arrangement where the spring 74 is disposed adjacent to the housing 62 for the controlled element 60.

As also should be apparent, the spring 74 is illustrated as being a coil spring. However, any other type of biasing device or element may be employed without departing from the scope of the present invention.

Figure 6:
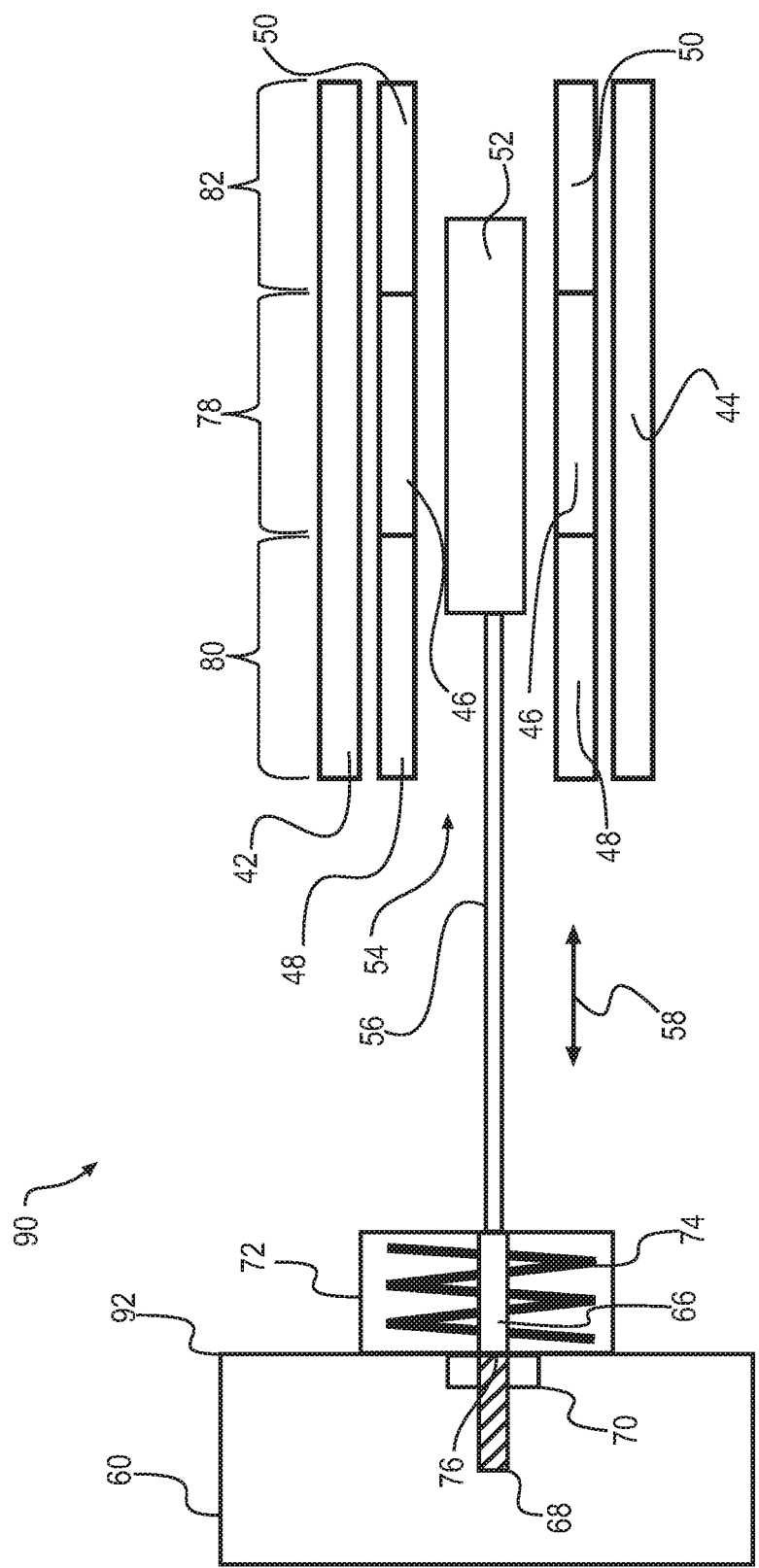
FIG. 6 is a graphical representation of a variation of the first embodiment of the system for detecting a mechanical disconnect between a sensor and a control element shown in FIG. 2, with the system being shown in a connected state from the LVDT.

FIG. 6 illustrates a sensor system 90 according to the present invention. This embodiment of the sensor system 90 is a variation of the sensor system 40 illustrated in FIGS. 1 and 2. As should be apparent, this variation also is applicable to the sensor system 80 illustrated in FIGS. 4 and 5.

In the sensor system 90, the shaft 56 is connected directly to a moving element 92. As should be apparent, in this variant, the shaft 56 is not connected to a piston 64 within a housing 62. Instead, the shaft 56 is connected directly to the moving element 92, which may be a housing or other component that moves together with the control surface on the aircraft.

As illustrated, the shaft 56 is contemplated to be connected internally to the moving element with a connector 70, just as with the sensor system 40. As should be apparent, however, the shaft 56 may be connected in any manner that is required or desired for the particular circumstances associated with the individual installation location. In this regard, it is noted that the embodiments of the sensor system 40, 80 also may rely on a connector other than the connector 70 without departing from the scope of the present invention.

FIG. 7 is a graphical illustration of a third embodiment of a sensor system 94 according to the present invention. This embodiment applies the principles for detecting a mechanical disconnect between an RVDT 96 and a controlled element 60.

In FIG. 7, the controlled element 60 is not illustrated.

The sensor system 94 includes an RVDT 96 having a housing 98 and a central shaft 100. A core 102 is mounted on the shaft 100 and rotates, within a bore 132 in the direction of the arrows 104. The RVDT 96 includes a primary coil 106, a first secondary coil 108, and a second secondary coil 110. As with the prior embodiments, the core 102 is contemplated to be oriented with respect to the primary coil 106 in the steady state (or normal operating) condition. As illustrated in FIG. 7, the primary coil 106 may be associated with a first ferrous core 112, the first secondary coil 108 may be associated with a second ferrous core 114, and the second secondary coil 110 may be associated with a third ferrous core 116.

With respect to the sensor system 94, a lever 118 connects to the shaft 110. A spring 120 (or other biasing element) connects between the lever 118 and a connection point 122. If there is a mechanical disconnect between the RVDT 96 and the associated controlled element 60, the spring 120 biases the core 102 to the second secondary coil 110, as indicated by the arrow 124.

While the lever 118, spring 120, and connection point 124 are illustrated as being within the RVDT 96, it is noted that these elements may be external to the RVDT 96, just as in the sensor systems 40, 84, 90 described above. The location of the lever 118, spring 120, and connection point 122 are not critical to operation of the present invention.

With further reference to FIG. 7, it is noted that the primary coil 106 is associated with a primary sensing region 126. The first secondary coil 108 is associated with a first secondary sensing region 128. Similarly, the second secondary coil 110 is associated with a second secondary sensing region 130.

In connection with the LVDT 42 and the RVDT 94, a primary sensing region 78, 126, a first secondary sensing region 80, 128, and a second secondary sensing region 82, 130 are described. In both embodiments, the second secondary sensing region 82, 130 is the sensing region selected as the default position for the out-of-range or fault position of the core 52, 102. As should be apparent, the out-of-range or fault position may be selected in association with the first secondary sensing region 80, 128 without departing from the scope of the present invention.

As noted above, the sensor system 40, 84, 90, 94 is not considered to be limited to an LVDT 42 or an RVDT 96. Similarly, the sensor system 40, 84, 90, 94 is not considered to be limited to constructions where the VDT (i.e., the LVDT 42 or the RVDT 96) includes a first coil (i.e., the primary coil) 46, 106, a second coil (i.e., a first secondary coil) 48, 108, and a third coil (i.e., a second secondary coil) 50, 110. To the contrary, it is contemplated that the VDT 42, 96 may operate by relying on a core 52, 102 and only one coil, such as the first coil 46, 106. As should be apparent, two or more cores 52, 102 may be employed. Similarly, two or more coils 46, 106, 48, 108, 50, 110 may be employed without departing from the scope of the present invention.

With respect to the sensor systems 40, 84, 90, 94, it is noted that the bores 54, 132 are merely spaces within the housings 44, 98. While the bores 54, 132 are circular in cross-section, the bores 54, 132 need have any predetermined shape. Accordingly, while the term "bore" 54, 132 is employed herein, the term should not be understood to be limited to any particular shape.

The present invention has been described in connection with one or more embodiments. It is contemplated that features from one embodiment may be substituted for features in other embodiments without departing from the scope of the present invention. In addition, as should be apparent to those skilled in the art, there are numerous variations and equivalents of the embodiments that should be apparent to those skilled in the art. The present invention is intended to encompass those variations and equivalents, as if described herein.

What is claimed is:

1. A system for detecting mechanical failure of a connection between a variable differential transformer and a controlled element having a controlled element housing, comprising:
    a variable differential transformer comprising a housing encapsulating a first coil;
    a bore in the housing for the variable differential transformer, wherein the bore is adjacent to the first coil;
    a core disposed in the bore;
    a shaft connectible between the core, at a first end, and the controlled element, at a second end, wherein the shaft comprises a break point where there is a break of the shaft at the break point after the break point is identified, said break point being proximate the controlled element housing;
    a biasing element connected to the shaft; and
    a biasing element housing disposed around the biasing element,
    wherein, responsive to the break in the shaft at the break point, the biasing element is adapted to move the core away from the controlled element housing to an out-of-range position detectable by the first coil and the biasing element housing is adapted to move together with the shaft after the break in the shaft.

2. The system of claim 1, wherein the core is disposed in the bore such that the core is adapted to slide within the bore such that the out-of-range position corresponds to a maximum location away from the controlled element.

3. The system of claim 2, wherein the variable differential transformer is a linear variable differential transformer.

4. The system of claim 1, wherein the core is disposed in the bore such that the core is adapted to rotate within the bore such that the out-of-range position corresponds to a maximum rotation of the core in the bore.

5. The system of claim 4, wherein the variable differential transformer is a rotary variable differential transformer.

6. The system of claim 1, further comprising a second coil and a third coil disposed in a vicinity of the first coil.

7. The system of claim 6, wherein the out-of-range position is detectible by at least one of the second coil or the third coil.

8. The system of claim 1, wherein the first coil comprises coils of wires for conducting an electrical current.

9. The system of claim 1, wherein the core comprises a magnet or a magnetized material.

10. The system of claim 1, wherein the biasing element comprises a spring.

11. The system of claim 10, wherein the spring is a coil spring.

12. The system of claim 1, wherein, at the second end, the shaft comprises:
    a threaded section; and
    a larger diameter section adjacent to the threaded section, between the first end and the second end of the shaft, wherein the larger diameter section engages the spring housing.

13. The system of claim 12, wherein the threaded section is adapted to engage a piston within the controlled element.

14. The system of claim 1, wherein the biasing element is disposed adjacent to the controlled element.

15. The system of claim 1, wherein the biasing element is disposed adjacent to the housing for the variable differential transformer.

16. The system of claim 1, further comprising:
   a lever connected to the shaft, wherein the biasing element connects between a connection point and the lever.

17. The system of claim 16, wherein the biasing element is disposed adjacent to the controlled element, outside of the housing for the variable differential transformer.

18. The system of claim 16, wherein the biasing element is disposed within the housing for the variable differential transformer.

\* \* \* \* \*